Patented June 23, 1942

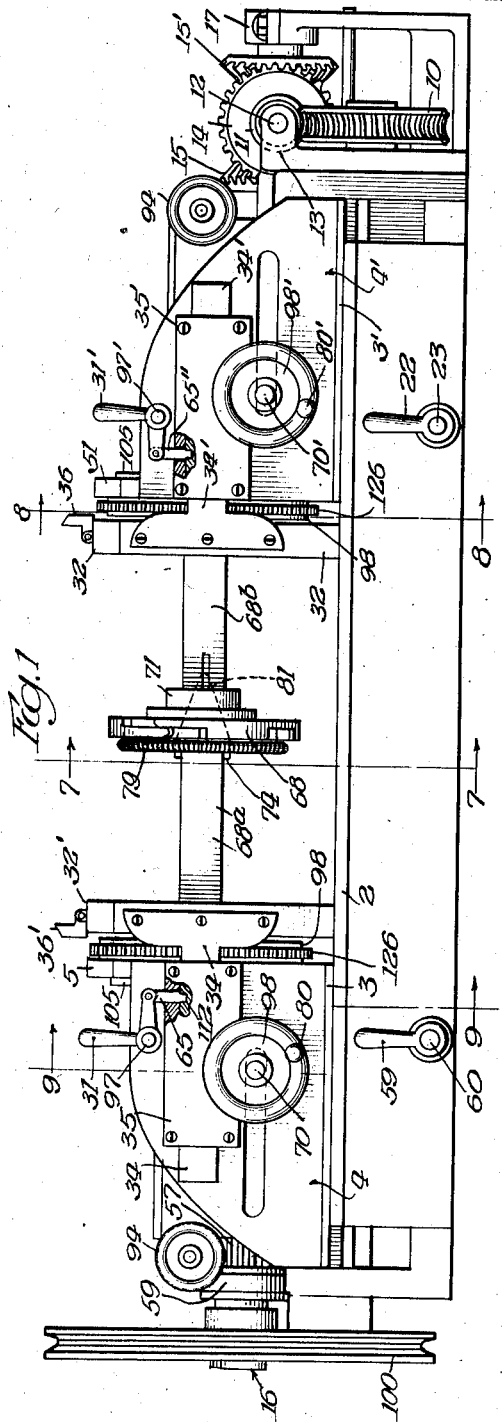

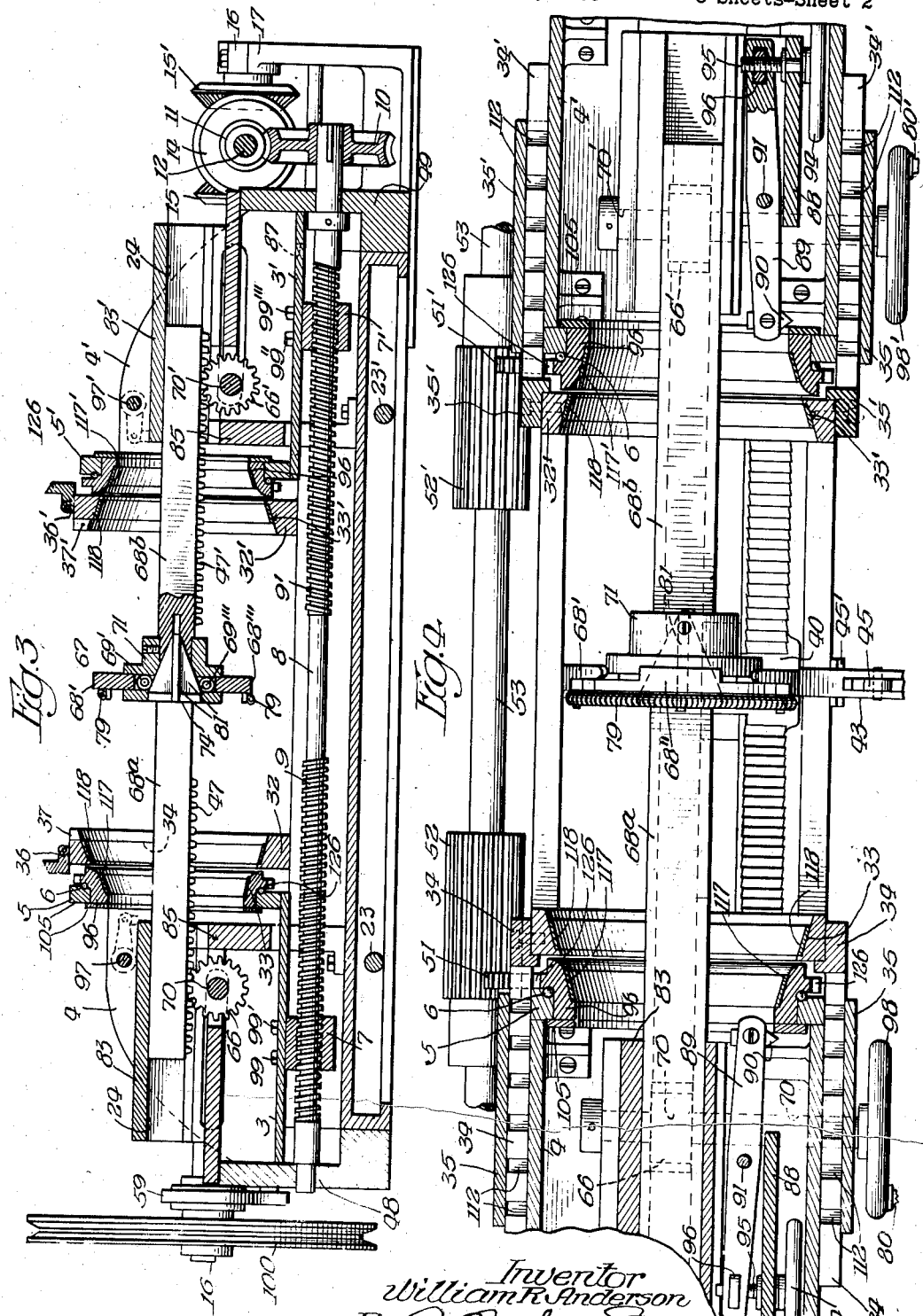

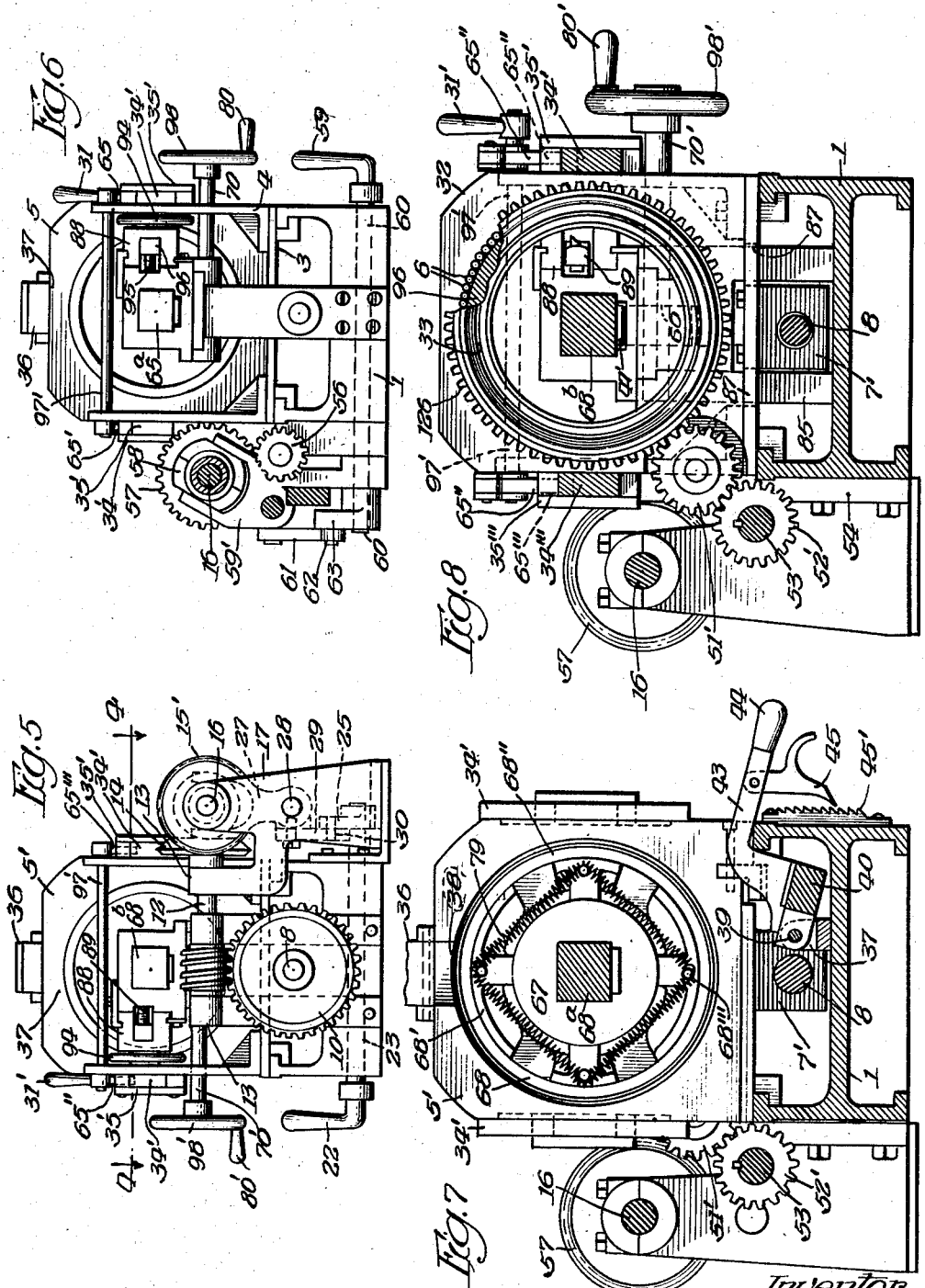

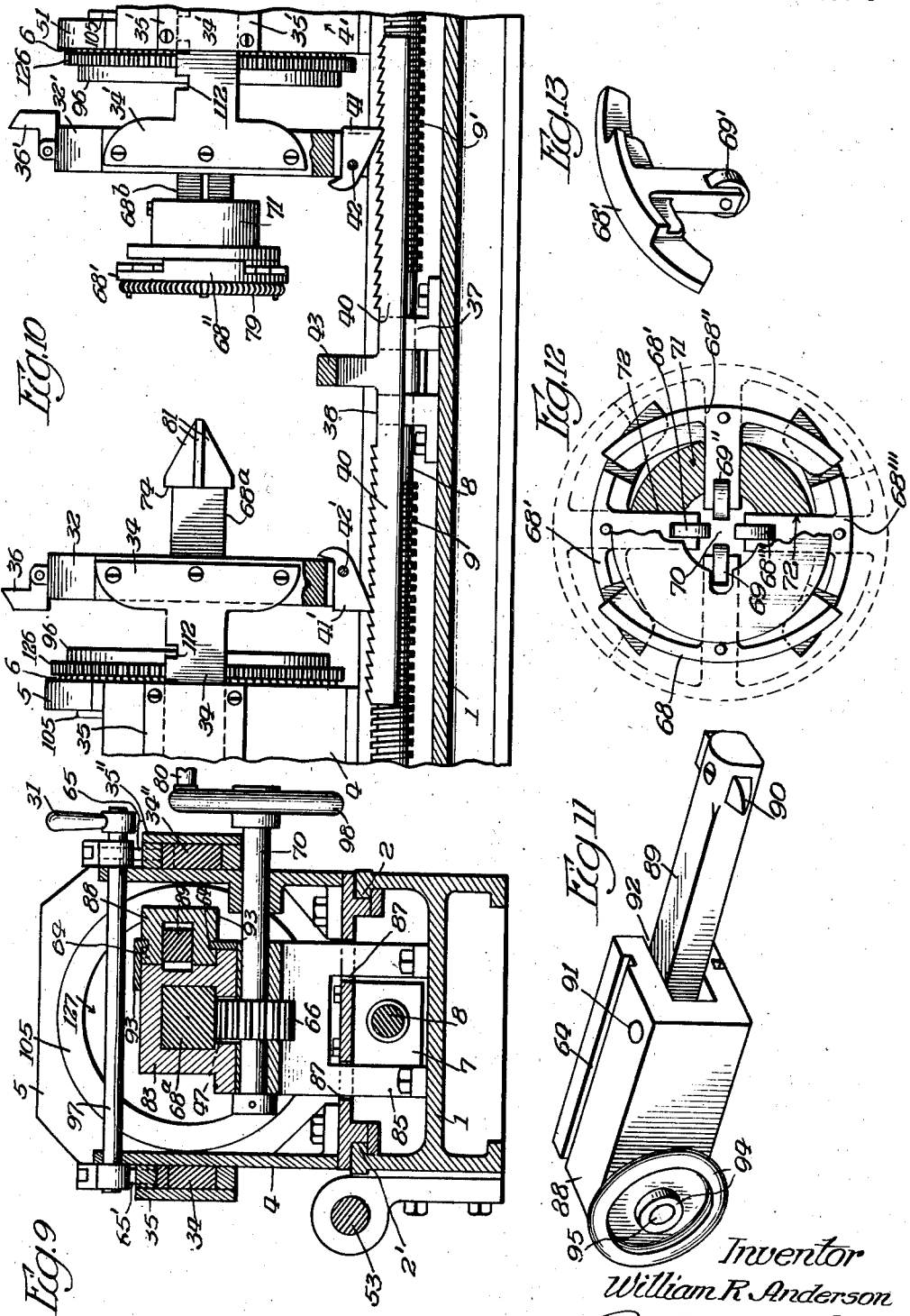

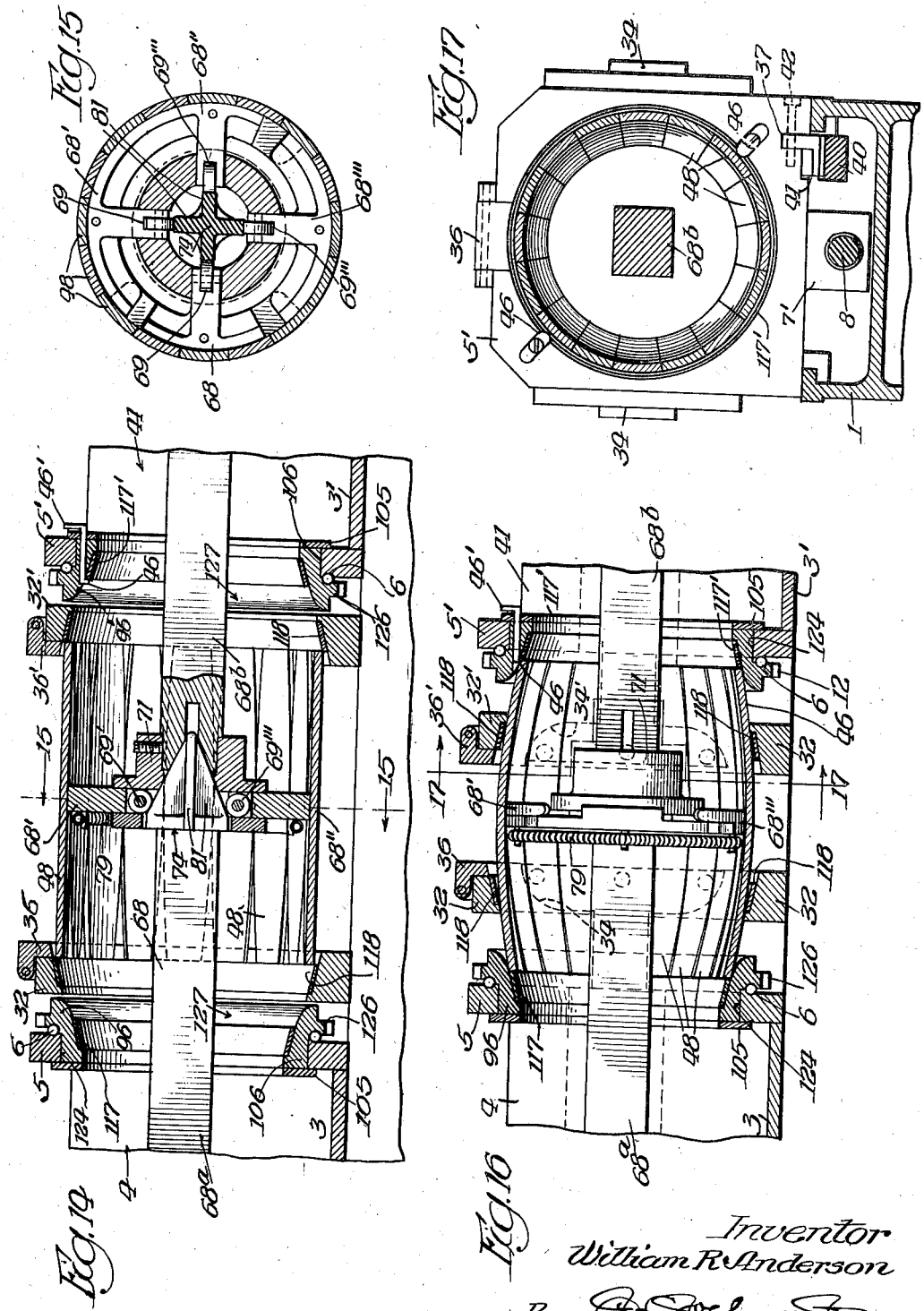

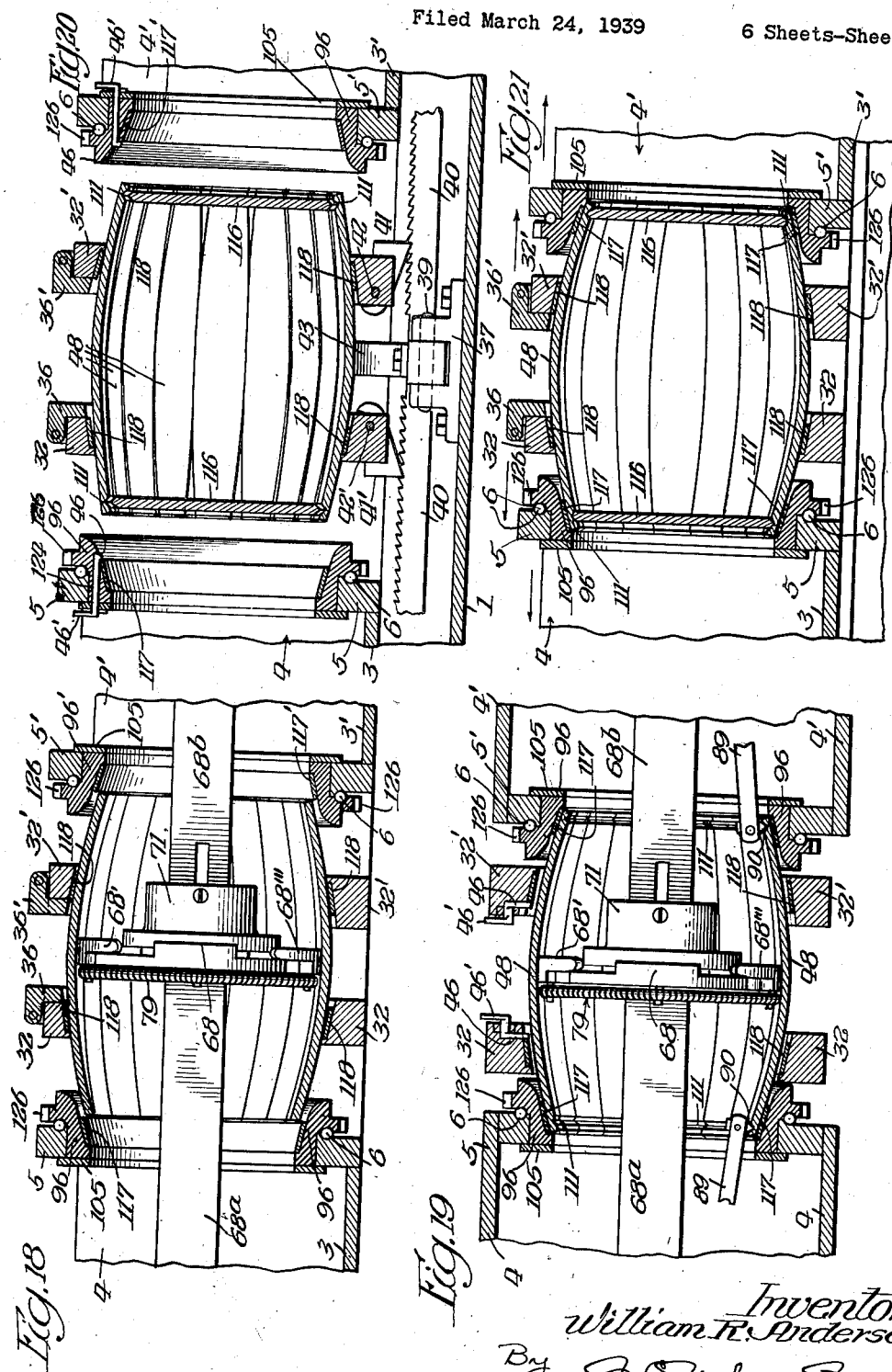

2,287,658

UNITED STATES PATENT OFFICE 2,287,658

BARREL ASSEMBLING MACHINE

William Ralph Anderson, Chicago, Ill.

Application March 24, 1939, Serial No. 263,942
In Canada October 26, 1937

27 Claims. (Cl. 147—1)

This application is a continuation in part of application Serial No. 108,321 filed October 30, 1936.

This invention relates to the manufacture of wooden barrels or kegs and to machines and methods for carrying out such manufacture.

The machinery and methods heretofore employed in the manufacture of high grade wooden barrels requires the expenditure of relatively large sums of money for many different types of machines, each of which performs but a single one of the many operations required to make a complete barrel and also involves the employment of highly skilled mechanics. For example, a separate machine is used for the assembling of the staves to form the barrel drum; another machine is employed for planing or turning the exterior of the barrel; still another for crozing the inside of the barrel; separate operations are also employed for placing the truss hoops over the barrel and tightening the staves, and still other operations are necessary for placing the heads in the barrels and forcing the hoops in place upon the barrel. Without going into all of the details regarding the methods as heretofore employed in the cooperage industry, it will be sufficient to state that it is the usual practice in the industry to have each of the various operations involved in the manufacture of a barrel performed by different sets of workers and the barrel during its course of manufacture and assembly being moved from one place in the manufacturing plant to another until the final steps have been completed. This movement of the barrel from station to station, from one machine to another and from one crew of workers to another, requires considerable handling and the consequent employment of additional labor for such handling. In fact, it may be said that although much has been done in the way of improvement of the several separate machines that are commonly employed in the cooperage industry to perform the various operations, there has been very little progress in the cooperage, or barrel making industry, or real departure from the methods of manufacture that have been in use for many years, since my invention in connection with such machines, for which Patent Number 2,054,918 was issued September 22, 1936.

It is the object of the present invention to improve upon the methods heretofore commonly used in the cooperage industry so that the large number of purely hand operations may be eliminated and to provide in a single sturdy, compact and simple machine, a grouping of means and instrumentalities capable of performing the entire series of manufacturing steps necessary to manufacture as a completely finished product, a wooden keg or barrel starting with the perfectly flat steamed stave, and to render unnecessary a large number of the hand operations that have heretofore been considered essential.

A further object is to provide in a single complete, unitary assembly, a machine for bending the staves into the desired configuration, holding the individual staves in proper assembled condition; turning or planing the exterior of the barrel; forcing the truss hoops over the drum formed by the assembling of the staves; crozing the barrel; placing the heads into the crozed ends of the barrel; removing the truss hoops and forcing the regular barrel hoops into proper position upon the exterior of the barrel; all of the means and instrumentalities required for performing the above operations being performed by a single machine, the running of which requires the services of but a single operator.

A machine constructed in accordance with the present invention includes in a unitary assembly a number of inter-related and co-operating mechanisms, certain of which at times perform some of the different various operations required for the manufacture of a complete barrel, the basic underlying feature of the machine upon which may be said to depend the successful performance of the machine as a whole resides in the stave bending mechanism which bends all the staves into a barrel at the same time.

It is, therefore, one of the primary objects of the present invention to provide a new and improved method and machine for bending all of the staves into a barrel at the same time.

In general there are only three types of wooden barrels commonly used today which will hereinafter be referred to as types A, B and C.

*Type A.*—The slack barrel, which is not usually leakproof against either gases or liquids such as the sugar or flour barrel.

*Type B.*—The tight barrel such as a wine, vinegar or whiskey barrel, which is leakproof for liquids but not usually leakproof against internal gas pressure.

*Type C.*—The tight barrel such as a beer barrel, which must be leakproof against liquids and also internal gas pressure. This type of barrel must be much more sturdy and tight than those of types A and B.

It is not an object of this invention to manufacture beer barrels of type C.

Another principal object of this machine is to provide a new and improved instrument for bending barrel staves in accordance with the method of the present invention and which instrument may be conveniently assembled upon or associated with an adjustable table and works in conjunction with an expansion ring and trussing means in such manner that all the necessary staves can be bent into a barrel at the same time.

The above and other objects of the invention will appear more fully from the following more detailed description and by reference to the accompanying drawings forming a part hereof, and wherein—

Figure 1 is a side elevation of a machine of this character constructed in accordance with the principles of this invention.

Figure 2 is an elevation taken from the side of the machine opposite to that shown in Figure 1.

Figure 3 is a vertical longitudinal sectional view of Figure 1.

Figure 4 is a horizontal sectional view on an enlarged scale, taken on line 4—4, Figure 5.

Figure 5 is a right hand elevation of Figure 1.

Figure 6 is a view taken on line 6—6 Figure 2, partly in elevation, partly in section, and with parts omitted, on an enlarged scale.

Figure 7 is a detail vertical sectional view, on an enlarged scale, taken on line 7—7 Figure 1.

Figure 8 is a view partly in elevation, partly in section and partly broken away, as taken on line 8—8, Figure 1 on an enlarged scale.

Figure 9 is a detail sectional view taken on line 9—9, Figure 1, on an enlarged scale.

Figure 10 is a detail view partly in side elevation, partly in section, and with parts omitted showing the hoop holding members and the expansible ring or anvil in partly separated positions.

Figure 11 is a detail perspective view of one of the crozing knives.

Figure 12 is a view partly in front elevation, partly in section, and partly broken away, of the expander ring.

Figure 13 is a detail perspective view of one of the elements of the expander ring.

Figure 14 is a view partly in section and partly in elevation showing the position some of the parts will assume at the time that the barrel staves are first placed into the machine.

Figure 15 is a detail sectional view taken on line 15—15 Figure 14.

Figure 16 is a view similar to Figure 14 showing the parts in another position, some of the parts being shown in elevation.

Figure 17 is a detail sectional view taken on line 17—17 Figure 16.

Figures 18, 19, 20 and 21 are detail sectional views showing the positions some of the parts will assume at the different stages or steps of operation of the machine in assembling the staves into a barrel.

The machine consists essentially of a supporting base 1 upon which the mechanism is mounted and is provided with guideways 2 and 2' which act as tracks upon sliding adjustable tables 3 and 3' which move toward and from each other in a direction longitudinally of the machine.

Centrally attached to and under the base of the table 3 by means of bolts 99 and 99', as shown more clearly in Figure 3, is a threaded nut 7, and under the table 3' and secured thereto by bolts 99'' and 99''', is a similar nut 7'.

Side table brackets 4 and 4' brace the front table brackets 5 and 5' and the latter have annular inside openings as at 124 and contain ball thrust bearings 6 as shown more particularly in Figure 8. These brackets are adapted to support rotary end hoop containers 96 and 96', each of which have a beveled annular opening 127, geared flange 126, bearing portion 106 and detachable retaining flange 105. Said end hoop containers are designed to contain or hold the end hoops 117 and 117' of a barrel.

A series of lug or hoop locks, such as lock 46, are countersunk into and flush with the faces of the hoop containers 96 and 96' and may be actuated by a hand hold 46'.

The rotation of hoop containers 96 and 96' is effected through idler gears 51 and 51' which connect with pinion gears 52 and 52', said pinion gears being keyed to shaft 53.

The nut on table 3 is threaded left handed, and that on table base 3' is threaded right handed. A suitable rotary shaft 8 with left handed thread 9 and right handed thread 9' is attached longitudinally with suitable bearings 48 and 49 centrally on top of base 1, directly below tables 3 and 3' in such manner that when it is rotated through nuts 7 and 7' the tables will slide either toward or away from each other in accordance with the direction of the shaft rotation.

Worm gear 10 is keyed to rotary shaft 8 and is driven by worm 11 which rotates on shaft 12 in bearings 13 and 13'. Bevel gear 14 is keyed to shaft 12 and meshed with bevel gears 15 and 15'. Bevel gears 15 and 15' rotate on rotary shaft 16 which rotates in bearings 17, 17' and 18. The direction of the rotation of worm 11 is governed by clutches 19 and 19' which can alternately be engaged with bevel gears 15 and 15'. Bearing bracket 20 suitably supports bearings 17 and 17' and is attached to base 1. Handle 22 keyed to shaft 23 is a clutch control lever. The rear end of shaft 23 is suitably connected to arm 25.

A suitable clutch shifting device consists of collar 26, shifting finger 27, sliding rod 28 and arm 29 which pivots on pin 30 in arm 25 in such manner that the movement of handle 22 governs the shifting of clutches 19 and 19'.

Truss brackets 32 and 32' each consist of a suitable frame with beveled interior openings 33 and 33'. Said openings are similar in size and shape to the openings in the interior of the barrel truss hoops commonly used in the cooperage industry. Said brackets are supported by arms 34, 34', 34'' and 34'''. Centrally located on the top of truss bracket 32 is a stave door 36 and upon top of truss bracket 32' is stave door 36'. These doors can be opened or closed. When they are opened staves can enter the machine through openings 37 and 37'.

When tables 3 and 3' move toward each other truss brackets 32 and 32' are also moved toward each other, and unless they are locked in their desired positions said brackets, merely by force of the friction of arms 34, 34', 34'' and 34''' in their respective grooves, have a tendency to move away from each other when the tables are moved away from each other.

In order to overcome this objection there is provided locking means for the inner hoop holding members 32—32' which embodies a member 40 pivotally mounted between bracket or bearing members 37—38 upon the pivot pin 49 (see particularly Figures 7 and 10). This member 40 is provided with right and left facing ratchet teeth to be engaged by pivotally mounted elements 41—41' in such a manner that when the handle 44 is operated to swing the bar 43 and consequently the member 40 upwardly, the elements or lugs 41—41' will engage the respective teeth and will hold the inner hoop holding members 32—32' in their desired position. As shown more clearly in Figure 7, the member 40 and the bar 43 may be held in their elevated or raised position by means of a dog or pawl 45 engaging ratchet teeth 45'.

Shaft 53 rotates in bearings 54, 54' and 55. The rotation of this shaft is effected through gear 56 which meshes with gear 57 which is controlled by clutch 58. Handle 59 connected to shaft 60 is the control lever for clutch 58.

Collar 59, yoke 59', link 61, pivot pin 62, and arm 63 on shaft 60 comprise a shiftable clutch mechanism for controlling the gear 57.

An expansion ring device (see particularly Figures 7 and 12) consists of expansion ring 67, a pair of slidable rectangular rams 68 and 68' which are racks with geared teeth 47 and 47' cut into their lower edges, means for moving said rams toward and away from each other, proper housings and supports for each ram, and a plunger head 74 adapted to plunge into an opening 70 in expansion ring 67.

The expansion ring 67 consists of slidable rams 68, 68', 68'' and 68''', rollers 69, 69', 69'' and 69''', suitable circular frame or housing 71, with slotted guideways 72 and a coil spring 79 adapted to hold the slidable rams in their proper position. This expansion ring is attached to one end of slidable ram 68b.

The plunger head 74 is attached to one end of slidable ram 68 in such manner that it is directly in front of the center of expansion ring 67. The sliding movement of each ram is effected by their respective geared teeth 47 and 47', gears 66 and 66', shafts 70 and 70' and control handle 80 and 80' on wheels 98 and 98'. The plunger head has four equally spaced ribs 81, as shown in Figure 1.

When the expansion ring and the plunger head are forced together the ring is expanded so that the outside circumference is a perfect circle, the plunger head ribs pressing outward against rollers 69, 69', 69'' and 69'''.

When the tables 3 and 3' move either forward or backward, the housing and supports of the slidable rams 68 and 68' are not affected.

The rams 68a and 68b each slide in a slot 24 in their respective housings 83 and 83' and these housings are supported at one end by posts 85 and the posts are attached to or supported by the top of the base 1. These posts project upwardly from the base 1 through slots 87 in the movable tables 3—3' and the purpose of said slots is to provide the necessary clearance to the stationary posts so that the tables 3—3' can be moved toward and away from each other.

As shown more particularly in Figures 4 and 11, the crozing knife devices each consist of a grooved housing 88, knife holding bar 89 and a crozing knife 90. The knife holding bar 89 moves upon a pivot pin 91 in slot 92. Tracks 93 and 93' are attached to the crozing knife housing and are adapted to slide in suitable grooves similar to groove 64 (Figure 18) laterally installed in ram housings 83 and 83' in a direction substantially longitudinal of the machine in such manner that the entire crozing knife device can be moved to and from a barrel assembled in the machine. The feeding of crozing knives 90 into the end of a spinning barrel is effected by means of hand control wheel 94 which turns the threaded shaft 95 through nut 96 and is pivotally attached to the end of crozing knife bar 89 which is opposite the knife end of said bar.

The combination of the crozing knife device with the spinning of the barrel may be compared to a common wood turning lathe.

As shown in Figure 14, the first step in assembling a barrel is to place the staves 48 through the stave door openings 37—37' on the fully expanded expansion ring 67, which latter must be centrally located between the properly spaced truss brackets or inner hoop holding members 32—32'. The staves as they are thus inserted are fed or successively moved around the expansion ring 67 by hand, and this operation is continued until all of the staves have been placed in position to form an unbent barrel drum, as shown more particularly in Figure 14. The staves are held in this position around the expansion ring 67 by means of the beveled or tapered inside annular openings in the truss brackets or inner hoop holding members 32—32'.

Stave doors 36 and 36' are then closed to keep the last stave from springing out of the machine during the bending operation. With the end barrel hoops 117 and 117' placed in hoop containers 5 and 5' the bending operation is effected by first moving tables 3 and 3' sufficiently together to slightly bend the staves by forcing beveled truss brackets 32—32' a short distance on the barrel. The ends of the barrel have then not been squeezed or trussed small enough in diameter to enter the end hoops 117—117' and they butt against the faces of the hoop containers 5 and 5' and are equalized in their position by a slight pressure exerted by the faces of said hoop containers. Truss brackets 32 and 32' are then locked in their present positions by means of locking device 40 and tables 3 and 3' are moved away from each other to a suitable distance and the truss bracket arms 34—34'—34'' and 34''' are locked by operating the hand levers 31 and 31' which are connected to shafts 97 and 97' and operate lugs 65—65'—65''—65''' which may rise or fall in or out of slots similar to 112 (see Figure 10) in said bracket arms.

The truss brackets 32 and 32' are then unlocked and forced toward each other and the barrel is squeezed or trussed between the annular beveled openings in said brackets and thoroughly tightened in the center with the outside diameter of the ends of the barrel sufficiently reduced to permit the end hoops 117 and 117' to pass around the staves. The truss arm locks 40 and 41 are then unlocked and the tables are again moved toward each other firmly trussing the ends of the barrel into their proper configuration.

When the end hoops are firmly on the barrel and the expansion ring is reduced in diameter it may be removed through the end of the partially formed barrel and the center truss brackets 32—32' may be forced away from each other by hand permitting the barrel to be spun in the end hoop containers. The crozing knife devices are then moved to their proper positions, the barrel is spun and crozed in a manner similar to a wood turning lathe, and its exterior may also then be planed.

The center truss brackets 32—32' are then slightly forced forward by hand and locked. The expansion ring 67 is again expanded, thus holding the barrel in a firm position as the tables are moved away from each other. The locked end hoops 117—117' are thereby withdrawn from the barrel and both ends of the barrel spring open sufficiently to permit the entrance of the two heads. The expansion ring device is then contracted or reduced in diameter so as to permit it to be entirely withdrawn from the barrel through one end thereof. The heads are then placed in the crozed grooves at each end of the barrel by hand.

The tables are then moved toward each other forcing on the end hoops 117—117' thoroughly tightening the barrel. The end hoops locking devices are then released and the tables withdrawn, leaving the end hoops 117—117' on the completed barrel. Center hoops can then be placed around the barrel and tightened by forcing the faces of the truss brackets against them.

A V-belt pulley 100 is keyed on to the main drive shaft 16.

All of the movements involved in the entire operation of the machine are rendered active by being clutched to the said drive shaft.

Figures 4 and 11 show in detail the crozing knife which operates in the manner described so that the knife 90 cuts the chine in the staves 43 (see Figures 19) and the knife is adjustable by turning the handle 94 on the threaded shaft 95 which will cause the bar 89 to rock about its pivot 91.

Figure 7 illustrates in detail the locking mechanism for the inner hoop holding members or truss brackets by means of the pawl or dog 45 which is pivotally attached to the bar 43 so that it can be engaged or disengaged from the rack 45' which latter is provided with teeth so that when the handle 44 is raised the locking member or rack 40 will also be elevated. When this member or rack 40 is raised the locking elements 41—41' engage the teeth on the member 40 and thereby lock the truss or inner hoop holding brackets 32—32' against movement in directions away from each other.

While I have shown by way of illustration a construction of a machine which has proven highly satisfactory in practice, it will be understood that the invention is not limited to the specific constructional details of the machine described and illustrated but that many changes, variations and modifications may be resorted to without departing from the principles of the present invention.

What is claimed as new is:

1. In a barrel making machine, opposed inwardly facing hoop holders, an expansible member disposed between said holders, and about which member the staves are adapted to be placed, the ends of the staves projecting into hoops carried by said holders, means for expanding said member against the staves, means for moving said holders towards each other in directions lengthwise of said staves to force the hoops carried thereby over the staves to bend the staves on said expansion member as a fulcrum, means for rotating said holders, end hoop holders, and means for moving said end hoop holders towards each other in directions lengthwise of said staves to force the last said hoops over the ends of the staves.

2. In a barrel making machine, opposed inwardly facing hoop holders, an expansible member disposed between said holders, and about which member the staves are adapted to be placed, the ends of the staves projecting into hoops carried by said holders, means for expanding said member against the staves, means for moving said holders towards each other in directions lengthwise of said staves to force the hoops carried thereby over the staves to bend the staves on said expansion member as a fulcrum, means for rotating said holders, end hoop holders, and means for moving said end hoop holders towards each other in directions lengthwise of said staves to force the last said hoops over the ends of the staves, the co-operating hoop holders being also movable in directions away from each other, and means for locking one set of hoop holders against separation at a predetermined time in and during the operation of the machine, while the other co-operating hoop holders are being separated.

3. In a barrel making machine, opposed inwardly facing hoop holders, an expansible member disposed between said holders, and about which member the staves are adapted to be placed, the ends of the staves projecting into hoops carried by said holders, means for expanding said member against the staves, means for moving said holders toward each other in directions lengthwise of said staves to force the hoops carried thereby over the staves to simultaneously bend the staves on said expansion member as a fulcrum, means for rotating said holders, end hoop holders, means for moving said end hoop holders towards each other in directions lengthwise of said staves to force the last said hoops over the ends of the staves, and means for moving the said expansible member and the expanding means therefor through the said hoop holders.

4. In a barrel making machine, opposed inwardly facing hoop holders, an expansible member disposed between said holders, and about which members the staves are adapted to be placed, the ends of the staves projecting into hoops carried by said holders, means for expanding said member against the staves, means for moving said holders towards each other in directions lengthwise of said staves to force the hoops carried thereby over the staves to simultaneously bend the staves on said expansion member as a fulcrum, means for rotating said holders, end hoop holders, means for moving said end hoop holders towards each other in directions lengthwise of said staves to force the last said hoops over the ends of the staves, the parts of the first said hoop holders being separable to permit insertion of the staves and removal of the barrel, and means for locking said parts against separation.

5. In a barrel making machine, opposed inwardly facing hoop holders, an expansible member disposed between said holders, and about which members the staves are adapted to be placed, the ends of the staves projecting into hoops carried by said holders, means for expanding said member against the staves, means for moving said holders towards each other in directions lengthwise of said staves to force the hoops carried thereby over the staves to bend the staves on said expansion member as a fulcrum, means for rotating said holders, end hoop holders, means for moving said end hoop holders toward each other in directions lengthwise of said staves to force the last said hoops over the end of the staves, the said end hoop holders being rotatable to rotate the partially formed barrel and to aline the staves, and means for rotating the last said holders.

6. In a barrel making machine, opposed inwardly facing hoop holders, an expansible member disposed between said holders, and about which members the staves are adapted to be placed, the ends of the staves projecting into hoops carried by said holders, means for expanding said member against the staves, means for moving said holders toward each other in directions lengthwise of said staves to force the hoops carried thereby over the staves to bend the staves on said expansion member as a fulcrum, means for rotating said holders, end hoop holders, means for moving said end hoop holders towards each other in directions lengthwise of said staves to force the last said hoops over the end of the staves, and means individual to the hoop holders for controlling the operation thereof.

7. In a barrel making machine, opposed inwardly facing hoop holders, an expansible member disposed between said holders, and about which members the staves are adapted to be placed, the ends of the staves projecting into hoops carried by said holders, means for expanding said member against the staves, means for moving said holders toward each other in directions lengthwise of said staves to force the hoops carried thereby over the staves to bend the staves on said expansion member as a fulcrum, means for rotating said holders, end hoop holders, means for moving said end hoop holders towards each other in directions lengthwise of said staves to force the last said hoops over the end of the staves, a common source of actuating power, and means individual to and operatively connecting said hoop holders, said expansible member and the expanding means for said member to said common source of power.

8. In a barrel making machine, opposed inwardly facing hoop holders, an expansible member disposed between said holders, and about which member the staves are adapted to be placed, the ends of the staves projecting into hoops carried by said holders, means for expanding said member against the staves, means for moving said holders toward each other in directions lengthwise of said staves to force the hoops carried thereby over the staves to bend the staves on said expansion member as a fulcrum, means for rotating said holders, end hoop holders, means for moving said end hoop holders towards each other in directions lengthwise of said staves to force the last said hoops over the ends of the staves, said expansible member embodying a body portion, a plurality of segmental shaped elements, means tending normally to retract said elements, said elements provided with portions disposed in close proximity to the axis of said body portion, and a tapered member adapted to be forced between the last said portions to force said elements beyond the periphery of the said body portion and against the stress of the last said means.

9. In a barrel making machine, opposed inwardly facing hoop holders, means for positioning a member intermediate said holders and for withdrawing the same through said holders and about which member the barrel staves are arranged to form a barrel drum, means for moving said holders towards each other to force said hoops over the ends of the staves to bend the staves with respect to said members and to contract the ends of the barrel drum, end hoop holders, means for temporarily maintaining end hoops against displacement from their holders, whereby the end hoops may be moved temporarily onto and then off of said staves, to permit the barrel end to be positioned with respect to the staves, and then back on to the staves, means for rotating the barrel drum when the end hoops are initially in position on the staves, means whereby the said hoop maintaining means will be rendered inactive at a predetermined time in the cycle of operation of the machine whereby the end hoop holders may be retracted while the hoops remain upon the staves.

10. In a wooden barrel assembling machine, a base, a pair of opposed movable tables supported by said base, means for moving said tables toward and away from each other, a pair of inwardly facing rotary hoop containers supported one on each table and adapted to hold and also release barrel hoops, means for rotating said containers, a pair of opposed rams, means for moving said rams toward and away from each other, means for slidably supporting one of the rams on each of said tables, a plunger head attached to one of the rams, an expansion ring attached to the other of the rams opposite the said plunger head, means for forcing said plunger head into said expansion ring to expand the latter, means for contracting said expansion ring, a pair of adjustable movable truss brackets which have beveled interior circular openings adapted to truss a barrel, and means for locking said brackets in a stationary position.

11. A barrel assembling machine as claimed in claim 10 in which the expansion ring device comprises a pair of opposed rams slidably supported on the base of said machine, a plunger head attached to one ram, an expansion ring attached to the other ram directly opposite said plunger head, means for moving said rams toward and away from each other, a plurality of slidable arms carrying a roller at one end and being of segmental shape at the other end, said arms adapted to be projected and retracted and so shaped that when projected or extended to a predetermined distance, their outside faces will form a circle, a spring operating to retract said arms, and a wedge shaped portion on said plunger head adapted to enter said expansion ring to force said arms outwardly.

12. A barrel machine as claimed in claim 10 in which the rams are maintained against rotation and the means for moving said rams toward and away from each other comprises a plurality of teeth in each ram, pinion gears individual to and meshing with the teeth of the respective rams, means for rotating said pinion gears in alternating direction, and means for selectively controlling the direction of rotation of said gears.

13. A barrel assembling machine as claimed in claim 1 in which the said inwardly facing hoop holders comprise a pair of opposed flat face plates each of which has an inwardly facing beveled or tapered interior opening, a stave entrance for each opening, a stave door for the entrance, two pairs of slidable arms, one pair supporting one face plate and the other pair supporting the other face plates, locks individual to the arms for maintaining them against sliding movement, a dog connected to each face plate, and a toothed ratchet movable into and out of contact with said dog.

14. In a barrel assembling machine for assembling all of the staves to be bent into a barrel, into the form of an unbent barrel drum, a pair of truss brackets, means for centrally positioning an expansion ring with respect to said brackets, said brackets having beveled or tapered circular interior openings, each of said openings provided with a stave entrance, a closure for each stave entrance, the staves being assembled by passing them into said beveled interior openings through said entrances, means for supporting the outside ends of said staves by the inside beveled surfaces of said interior truss bracket openings, and means for closing the said closures.

15. In a barrel assembling machine, means for "heading up" or placing the heads in an assembled barrel drum, said means embodying end hoop containers and truss hoop brackets, means for moving said brackets away from each other in directions lengthwise of the staves, means for locking said brackets in a stationary position, means for moving the end hoops from said barrel drum to permit the crozed ends of the barrel staves to spring apart sufficiently to permit a barrel head to be placed in said crozed ends, the last said means also operable to move said truss brackets toward each other in directions lengthwise of the staves to simultaneously tighten the staves around said heads, and means for moving said end hoop containers toward each other to force said end hoops onto the staves to contact the ends of the staves about said ends.

16. In a barrel assembling machine of the character described, hoop holders, a locking device for the hoop holders, said locking device comprising a swingingly mounted member, a plurality of oppositely disposed teeth cut along opposite ends of said member, a handle attached to the said member for raising and lowering said toothed ends, means for holding said member in its adjusted position, a pair of opposed tongues pivotally attached to the hoop holders, for engagement with the respective said teeth of said ratchet in a manner that said hoop holders, when said tongues are engaged with their respective teeth of said ratchet, will be held against retrograde movement.

17. In a barrel assembling machine in which all of the staves of a barrel are simultaneously bent means for supporting the staves at the inside centers thereof to permit them to be bent, means for forcing one set of hoops over the staves in directions lengthwise of the staves to partially bend the staves, means for supporting the outside ends of said staves, means for simultaneously forcing another set or end hoops toward each other over the staves for a distance sufficient to further bend the staves, and means for equalizing the positions of the staves by abutting the ends thereof, the first said forcing means being also operable to contract the ends of the staves to thoroughly tighten or truss the staves and reduce the size of the ends of the drum so that said ends can receive the end hoops, the said end hoop forcing means being then movable to force the end hoops toward each other over said stave ends to thoroughly bend the staves to their proper configuration.

18. In a machine of the character described, means whereby all of the staves may be positioned to be simultaneously bent into a barrel, said means embodying means for supporting said staves approximately at the longitudinal centers thereof, the first said means also embodying means for supporting the outer ends of the staves, means for trussing the staves together by forcing a hoop around the ends of the assembled staves in directions lengthwise of the staves, means for rotating the partially formed barrel, means for crozing both ends of the assembled staves while they are being rotated, the end of the drum barrel being sufficiently opened by releasing said ends to permit a head to be placed in the end, the last said means also adapted to tighten the barrel sufficiently to permit the end hoops to be forced on to said barrel, said barrel being released to permit a center bilge barrel hoop to be placed thereon by hand and over each end of the barrel, and means for forcing the center hoops into position.

19. In a barrel machine in which all of the staves are simultaneously bent by forcing hoops over the ends of the staves assembled to form a barrel drum, an expansion ring for supporting all of the assembled staves at the inside and substantially centrally thereof, means for expanding the ring, means for forcing an inner set of hoops over the assembled staves in directions lengthwise thereof to partially bend the staves over the expansion ring as a fulcrum, and means for forcing over the partially bent staves smaller end hoops, thereby to thoroughly tighten or truss the staves under further reduction in the size of the ends of the barrel drum.

20. In a barrel machine in which all of the staves are simultaneously bent by forcing hoops over the ends of the staves assembled to form a barrel drum, an expansion ring for supporting all of the assembled staves at the inside and substantially centrally thereof, means for expanding the ring, means for forcing an inner set of hoops over the assembled staves in directions lengthwise thereof to partially bend the staves over the expansion ring as a fulcrum, means for forcing over the partially bent staves smaller end hoops, thereby to thoroughly tighten or truss the staves under further reduction in the size of the ends of the barrel drum, the said means for contracting and tightening the ends of the barrel drum embodying end hoop holders, and means for operating the end hoop holders to temporarily force the end hoops over the ends of the staves and to withdraw the hoops and finally force them back over the ends of the staves.

21. In a barrel machine in which all of the staves are simultaneously bent by forcing hoops over the ends of the staves assembled to form a barrel drum, an expansion ring for supporting all of the assembled staves at the inside and substantially centrally thereof, means for expanding the ring, means for forcing an inner set of hoops over the assembled staves in directions lengthwise thereof to partially bend the staves over the expansion ring as a fulcrum, means for forcing over the partially bent staves smaller end hoops, thereby to thoroughly tighten or truss the staves under further reduction in the size of the ends of the barrel drum, the said means for contracting and tightening the ends of the barrel drum embodying end hoop holders, means for operating the end hoop holders to temporarily force the end hoops over the ends of the staves and to withdraw the hoops and finally force them back over the ends of the staves, and means controllable at will for locking the inner hoop forcing means against operation while the end hoop forcing means are being actuated to withdraw the end hoops from the barrel drum to permit the ends of the barrel drum to expand.

22. In a barrel machine, means for holding a plurality of unbent staves in assembled relation to form a drum, means for forcing hoops over the ends of the assembled staves, means supporting all of the staves intermediate their ends against inward movement whereby when the hoops are thus forced over the ends of the staves the staves will all be simultaneously given an initial bending intermediate their ends, and means for forcing another and smaller hoop over the ends of the bent staves to further bend them to contract the ends of said drum.

23. In a barrel machine, means for holding a plurality of unbent staves in assembled relation to form a drum, means for forcing hoops over the ends of the assembled staves, means supporting all of the staves intermediate their ends against inward movement whereby when the hoops are thus forced over the ends of the staves the staves will all be simultaneously given an initial bending intermediate their ends, and means for forcing another and smaller hoop over the ends of the bent staves to further bend them to contract the end of said drum, the said forcing means embodying means for temporarily holding the respective said hoops.

24. In a barrel machine, means for holding a plurality of unbent staves in assembled relation to form a drum, means for forcing hoops over the ends of the assembled staves, means supporting all of the staves intermediate their ends against inward movement whereby when the hoops are thus forced over the ends of the staves the staves will all be simultaneously given an initial bending intermediate their ends, means for forcing another and smaller hoop over the ends of the bent staves to further bend them to contract the end of said drum, the first recited means embodying a fulcrum, and means for positioning said fulcrum at a predetermined point with respect to the length of the staves.

25. In a barrel machine, means for holding a plurality of unbent staves in assembled relation to form a drum, means for forcing hoops over the ends of the assembled staves, means supporting all of the staves intermediate their ends against inward movement whereby when the hoops are thus forced over the ends of the staves the staves will all be simultaneously given an initial bending intermediate their ends, means for forcing another and smaller hoop over the ends of the bent staves to further bend them to contract the end of the drum, the first recited means embodying a fulcrum, means for positioning said fulcrum at a predetermined point with respect to the length of the staves, and means for operating said last said means to move the fulcrum out of the drum through one end thereof.

26. In a barrel machine, means for holding the staves in assembled relation to form a drum, means for forcing hoops over the ends of the assembled staves, means supporting all of the staves intermediate their ends against inward movement whereby when the hoops are thus forced over the ends of the staves the staves will be bent intermediate their ends, means for forcing another and smaller hoop over the ends of the bent staves to contract the ends of the drum, the first recited means embodying an expansible fulcrum, means for positioning said fulcrum at a predetermined point with respect to the length of the staves, and means for expanding said fulcrum.

27. In a barrel machine, means for holding the staves in assembled relation to form a drum, the said means embodying an expansible and contractable fulcrum about which the staves are assembled, means for forcing hoops over the ends of the assembled staves to partially bend them over said fulcrum, means for forcing other and smaller hoops over the ends of the partially bent staves to contract the ends of the drum, means movable into the drum through one end thereof to expand said fulcrum, and mechanism for removing said fulcrum from the drum through one end thereof when the fulcrum is contracted.

WILLIAM RALPH ANDERSON.